E. A. OLLEY.
PANEL BOARD CONSTRUCTION.
APPLICATION FILED AUG. 6, 1915.
1,296,999.
Patented Mar. 11, 1919.
2 SHEETS—SHEET 1.
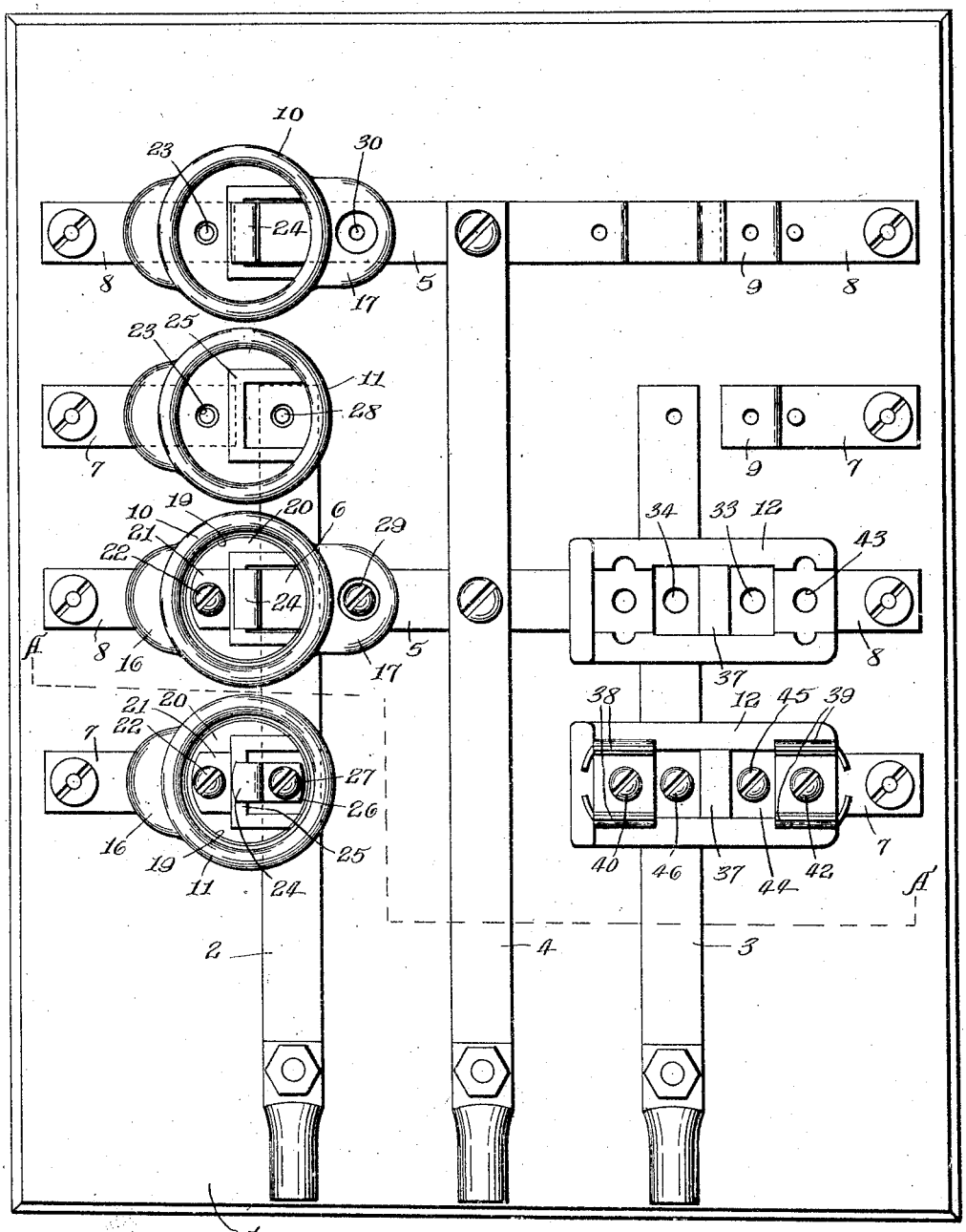
Fig-1-
WITNESSES:
INVENTOR.
Edwin A. Olley.
BY Parsons & Bodell
ATTORNEYS.

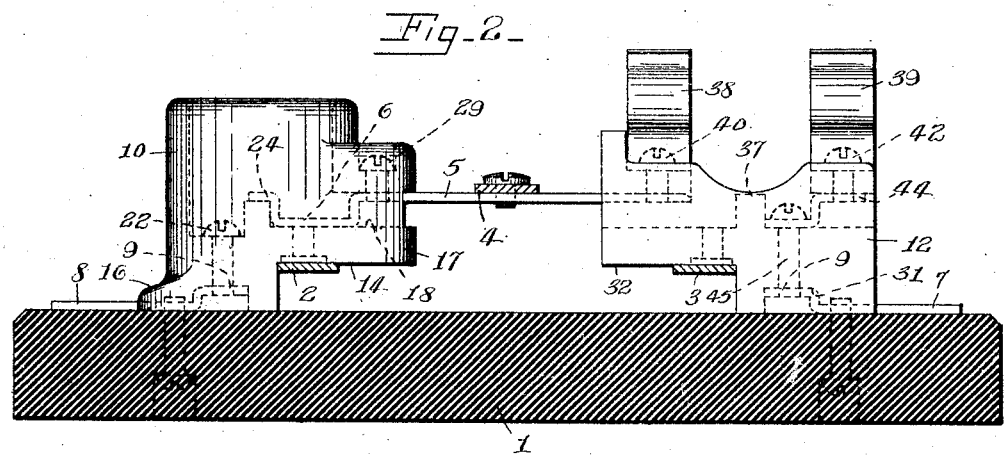
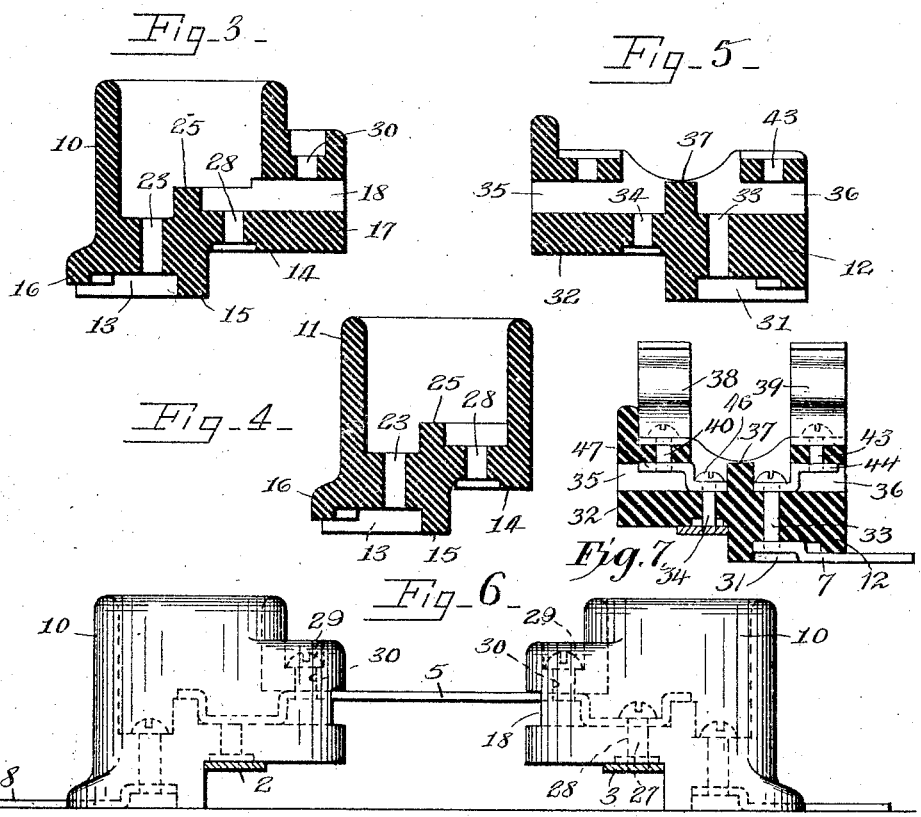

UNITED STATES PATENT OFFICE.

EDWIN A. OLLEY, OF SYRACUSE, NEW YORK, ASSIGNOR TO CROUSE-HINDS COMPANY, OF SYRACUSE, NEW YORK, A CORPORATION OF NEW YORK.

PANEL-BOARD CONSTRUCTION.

1,296,999.     Specification of Letters Patent.     Patented Mar. 11, 1919.

Application filed August 6, 1915. Serial No. 43,966.

*To all whom it may concern:*

Be it known that I, EDWIN A. OLLEY, a citizen of the United States, residing at Syracuse, in the county of Onondaga and State of New York, have invented a certain new and useful Panel-Board Construction, of which the following is a specification.

This invention relates to panel boards, and has for its object a particularly simple and efficient construction by which the widthwise dimension of the panel board is reduced, and the invention consists in the combinations and constructions hereinafter set forth and claimed.

In describing this invention, reference is had to the accompanying drawings, in which like characters designate corresponding parts in all the views.

Figure 1 is a plan view of a panel board embodying my invention, two species of electrical appliances being shown thereon, and parts of some of the appliances being removed.

Fig. 2 is a section on line A—A, Fig. 1.

Figs. 3 and 4 are detail views of the bases of the appliances shown on the left-hand side of the panel board in Fig. 1.

Fig. 5 is a detail view of the base of the electrical appliances shown on the right-hand side of the panel board, Fig. 1.

Fig. 6 is a view similar to Fig. 2 illustrating another arrangement of my invention.

Fig. 7 is a view of the cartridge fuse electrical appliance when substituted for the electrical appliance shown in Fig. 4.

This panel board comprises, generally, a base, bus bars mounted on the base, pairs of load circuit bars mounted on the base and extending in a direction transversely of the bus bars, and electrical appliances for receiving fuse plugs or cartridge fuses mounted directly upon the bus bars and the load circuit bars. The panel board shown in Figs 1 and 2 is adapted to be connected in a three-wire system.

1 designates the base of the panel board, 2, 3, designate respectively, the outside bus bars, and 4 the intermediate or neutral bus bar, the bus bars 2, 3, 4 being supported on the base but spaced apart from the face of the base. 5 are sections of legs of the load circuits which extend laterally from the bar 4. The end portions 6 of the sections 5 are superposed above, and spaced apart from the bars 2, 3. Preferably, the intermediate bus bar 4 and the bar section 5 are spaced apart from the face of the base, a greater distance than the bars 2, 3.

7, 8 designate the members of the pairs of load circuit bars which are mounted directly on the face of the base and extend in a direction transversely of the bus bars 2, 3, 4, one member of each pair of bars, as 7, terminating close to one of the outside bus bars 2 or 3, and the other member 8 of each pair also terminating close to a bus bar 2 or 3, but being in line, or paired with, one of the load circuit bar sections 5, each bar 8 being of course below or nearer the base 1 than the bar section 5. Each bar 7 or 8 is also formed with one end offset from the base 1, as at 9.

10 designates the base of the electrical appliance for receiving a fuse plug. 11 is the base of another electrical appliance for receiving a fuse plug. 12 designates the base of an appliance for receiving a cartridge fuse. There is either a pair of electrical appliances having respectively bases 10 and 11, or two cartridge fuse bases 12 for each pair of load circuit bars 7, 8.

Of course, each pair of load circuit bars may have one cartridge fuse base 12 and one fuse plug socket 10 or 11, but in practice a panel board is either built to be equipped with fuse plug sockets or cartridge fuse bases throughout.

Each fuse plug socket base 10 and 11 is formed with a recess or passage 13 in its under side, opening through a lateral side thereof, and also with a recess or passage 14 in its under side, opening through the opposite lateral side thereof, the recess 14 being deeper than the recess 13 and separated therefrom by a barrier 15. The recess 13 is formed partly in a laterally extending foot 16 provided on the base 10 or 11. Each fuse plug socket base 10 is also formed with a laterally extending boss 17 on the side thereof opposite to that on which the foot 16 is located and above the recess 14 and with a passage 18 extending through the boss.

The recess or passage 13 of each base 10, 11 is for receiving one or the other of the bars 7, 8, and the recess 14 is a passage for one or the other of the bus bars 2, 3. The passage 18 is for one of the load circuit bar sections 5.

19 designates the sleeve terminal of the fuse plug socket base 11, this sleeve terminal having the usual base flange 20 which is clamped to the bottom of the socket of the base by a plate 21 and a screw 22 extending through the plate and the flange and through a passage 23 into the offset end 9 of the underlying load circuit bar 7, the screw 22 serving to hold the base 11 on the load circuit bar 7 and to electrically connect the sleeve terminal to the load circuit bar. Each base 11 is also provided with a central terminal 24 mounted on the central projection 25 in the socket of the base and having a foot 26 which is connected by means of a screw 27 to the underlying bar 2 or 3 extending through the recess 14, the screw extending through a passage 28. When a base 10 is used and the bar section 5 extends into the passage 18, the central terminal of the base is an integral extension of the bar section 5.

The screw 27 in addition to making electrical connection serves to secure the base 11 to the bus bar 2 or 3. As seen in Fig. 6 the base 10 also has a passage 28 for receiving a screw 27 connecting a bar section 5 to an outside bar 3 when a load circuit is connected in a two-wire system, and a base 10 is mounted on one load circuit bar 8, the bus bar 2, and a bar section 5, said bar section 5 being connected to the bus bar 3 by extending into the passage 18 of a second base 10, which second base 10 is mounted on the bus bar 3. Electrical connection is made with the bar 3 by screw 27 through passage 28 in said second base 10. In said base 10 mounted on the bar 3 the terminals are omitted and no fuse is used.

Each base 10 has a sleeve terminal and other parts similar to the terminal 19 and parts 20, 21, 22 and 23 of the base 11, the screw 22 of the base 10 threading into the bar 8. Each base 10 is also provided with a central terminal similar to the terminal 24, but this part 24 of the base 10 instead of being connected to the bus bar 2 or 3 is connected to the load circuit bar section 5, and said section 5 is secured to the base 10 by a suitable screw 29, extending through the upper face of the laterally extending boss 17 into engagement with the load circuit bar section 5, the screw being located in the passage 30.

When a panel board is equipped with fuse plug sockets, the central terminal 24 of each socket 10 is formed integral with the load circuit bar section 5 of the intermediate bus bar 4, and in placing the base 10 in position the base 10 is manipulated so that the passage 18 receives the bar section 5 when the base is being mounted in position.

The cartridge fuse bases 12 are provided with passages 31, 32 similar in form and function to the recesses or passages 13, 14 of the bases 10, 11 and with passages 33, 34 similar to the passages 23, 28 of said bases 10, 11. Each base 12 is also formed with a passage 35 similar to the passage 18 of the base 10. Said base 12 is also formed with a passage 36 alined with the passage 35 and opening through the outer side of the base 12, the passages 35 and 36 being separated by a barrier 37.

38, 39 are clips or cartridge fuse contacts mounted on the base 12, one as 38 being connected by means of a screw 40 to the load circuit bar 5 and the other 39 being connected by means of a screw 42 passing through a passage 43, to the conductor or terminal 44 arranged in the passage 36, this conductor 44 being connected by means of a screw 45 located in the passage 33, to the offset end 9 of one of the load circuit bars 7. The same base block 12 can be used in the same situation as either of the base blocks 10, 11. When the base is used in the same situation as the base 11 no conductor extends through the passage 35 but a conductor 47 similar to the conductor 44 is arranged in the passage 35 and is connected to the terminal 38 by the screw 40 and to the outside bus bar 2 or 3 by a screw 46 extending through said terminal 44, the passage 34 and into the bus bar 2 or 3.

This panel board is particularly advantageous in that it is economical in manufacture, can be readily equipped with either style of fuse, and further in that the width is greatly reduced over the panel boards in which the fuse receptacles are arranged in the ordinary manner.

What I claim is:—

1. A panel board including a base, bus bars supported on the base, one of the bus bars having a bar section extending laterally therefrom, and terminating near another bus bar, load circuit bars terminating near the latter bus bar and said bar section, and electrical appliances for carrying fuses including insulating bases mounted directly on one load circuit bar and one bus bar and on the other load circuit bar and said bar section, and having terminals in connection therewith, substantially as and for the purpose described.

2. A panel board including a base, bus bars supported on the base, a pair of load circuit bars supported on the base and extending in a direction transversely of the bus bars, and electrical appliances each including a base mounted directly on one load circuit bar and one bus bar, and terminals on the base connected respectively to the bars upon which the base of the appliance is mounted, substantially as and for the purpose described.

3. In a panel board, a base, bus bars mounted on the base and spaced apart from the face of the base, a pair of load circuit bars mounted on the face of the base and extending in a direction transversely of the bus bars, and electrical appliances, each including a base mounted directly on one load circuit bar and on one of the bus bars, and terminals mounted on the base of each appliance and connected respectively to the load circuit bar and the bus bar upon which the appliance is mounted, substantially as and for the purpose specified.

4. A panel board comprising a base, bus bars mounted on the base in substantial parallelism to each other, a load circuit bar section connected to one bus bar and extending laterally toward a second bar and having its end superposed above, and spaced apart therefrom, a pair of load circuit bars on the face of the base extending in a direction transversely of the bus bars, one load circuit bar being arranged in line with the load circuit bar section, an electrical appliance comprising a base mounted directly on one load circuit bar and on one of the bus bars, a second electrical appliance including a base mounted on the other load circuit bar and the superposed end of the load circuit bar section, and terminals on the bases of the appliances, the terminals being electrically connected to the bus bars and load circuit bars and bar sections on which the bases of said appliances are mounted, substantially as and for the purpose set forth.

5. A panel board comprising a base, three bus bars mounted on the base in substantial parallelism to each other, the bus bars being spaced apart from the face of the base, load circuit bar sections extending laterally from the intermediate bar toward the outside bars and having their ends superposed above the latter, pairs of load circuit bars on the face of the base extending in a direction transversely of the bus bars, some of the load circuit bars being arranged in line with the load circuit bar sections, and electrical appliances each comprising a base each mounted directly on one load circuit bar and on one of the outside bus bars or on the superposed end of the load circuit bar section, and terminals on the bases of the appliances, the terminals being electrically connected to the bars on which the bases of said appliances are mounted, substantially as and for the purpose described.

6. A panel board comprising a base, three bus bars mounted on the base in substantial parallelism to each other, the bus bars being spaced apart from the face of the base, and the intermediate bar spaced farther from the base than the outside bus bars, load circuit bar sections extending laterally from the intermediate bus bar toward the outside bars and having their ends superposed above, and spaced apart from, the latter, load circuit bars on the face of the base extending in a direction transversely of the bus bars, some of the load circuit bars being arranged in line with the load circuit bar sections, and electrical appliances comprising bases, each mounted directly on one load circuit bar and on one of the outside bus bars or on the superposed end of the laterally extending bar section, and terminals on the base of each appliance, the terminals being electrically connected to the bars on which the base of said appliance is mounted, substantially as and for the purpose specified.

7. An electrical appliance for panel boards comprising a base of insulation having recesses in its lower side opening through opposite lateral sides of the base, the tops of the recesses being arranged at different levels, the base being also provided with a passage extending laterally above the deeper recess and opening through a lateral side of the base, terminals mounted on the base, one of the terminals extending into the last-mentioned passage, and electrically connected means associated with the terminals and extending through the base, substantially as and for the purpose specified.

8. In a panel board, the combination of a base, three bus bars mounted on the base, the bus bars being spaced apart from the base, load circuit bar sections extending laterally from the intermediate bus bar toward the outside bus bars and having their end portions superposed above, and spaced apart from, said outside bus bars, pairs of load circuit bars mounted on the base and extending in a direction transversely of the bus bars, one of each pair being alined with one of the load circuit bar sections, and the other bar of each pair terminating below and near one of the outside bus bars, electrical appliances each including a base having a recess in its underside and opening through a lateral side of the base for receiving one of the load circuit bars of each pair, and also having a second recess in its under side through which one of the outside bus bars extends, and terminals on the base of the appliance electrically connected to the underlying load circuit bar and outside bus bar, and additional appliances, each including a base having a recess in its lower side for receiving the other load circuit bar of one pair, and a recess in its lower side through which one of the outside bus bars passes, and a laterally extending boss formed with a passage for receiving one of the load circuit bar sections, terminals on the base of the latter appliance, and connected to the load circuit bar and the bar section on which said appliance is mounted, substantially as and for the purpose set forth.

In testimony whereof, I have hereunto signed my name at Syracuse, in the county of Onondaga, and State of New York, this 30th day of July, 1915.

EDWIN A. OLLEY.

Copies of this patent may be obtained for five cents each, by addressing the "Commissioner of Patents, Washington, D. C."